May 12, 1942.  J. DICHTER  2,282,993
MANUFACTURE OF AMPOULES
Filed March 7, 1939  6 Sheets-Sheet 1

Inventor:
Jakob Dichter,
By Charles B. Belknap
Attorney

Patented May 12, 1942

2,282,993

UNITED STATES PATENT OFFICE 2,282,993

MANUFACTURE OF AMPOULES

Jakob Dichter, Berlin-Schoneberg, Germany

Application March 7, 1939, Serial No. 260,398
In Germany March 23, 1938

6 Claims. (Cl. 49—7)

The present invention relates to the manufacture of glass receptacles, and more particularly to the reshaping of glass tubing to form ampoules having an elongated neck portion thereon such as described in the patent to Jakob Dichter, No. 1,962,985, dated June 12, 1934.

It is common practice to form the reduced neck portion of an ampoule by heating a limited length of glass tubing between two cold portions thereof and then moving the cold portions away from each other to draw or elongate the heated portion so that the drawing will effect a reduction of the diameter of the tubing to thus form the neck. This neck portion will, of course, be tapered.

In the manufacture of ampoules, the burners employed to heat the section which is drawn out, define the limits of that portion of the tubing which will be softened by the heat. It is desirable in some cases subsequently to heat the tube further beyond the limits referred to during the drawing operation. This can be done only by the employment of additional burners or abnormally long burners, since, in the present practice, the burners have a movement only transverse to the axis of the tube.

One of the objects of the present invention is to so mount the burners that they are not only movable transversely with respect to the axis of the tube, but also in a direction parallel to the axis of the tube.

It is also an object of the invention to employ means for moving the burners longitudinally of the tube, which means may be adjustable to control the rate of drawing and thus produce a neck on the ampoule which may be tapered, or cylindrical, or of stepped formation.

It is also an object of the invention to form a preliminary constriction in the tube prior to the drawing operation and then to progressively heat the tube along its length during the drawing operation not only to produce the desired form of neck on the ampoule, but to control wall thickness in the drawn portion of the tube.

Further objects of the invention will be apparent from the following description thereof taken in connection with the accompanying drawings, in which—

In the drawings, the base of the machine is indicated at 1. Fixed to this frame is a shaft 2 upon which are rotatably mounted upper and lower plates or spiders 3 and 5 connected to each other by means of tie rods 6, so that the spiders rotate about the shaft 2 at the same speed. Also rotatably mounted on the shaft 2 is a spider 4 adapted to rotate at the same speed as spiders 3 and 5 and carrying the burners and constricting tools used to heat and shape the tube. Mounted in suitable bearings attached to the upper and lower spiders is a pair of parallel vertical rods 7, 7' adapted to support a plurality of pairs of gripping devices or chucks 8 and 10. Each upper chuck 8 is so mounted that its bearing has no relative vertical movement with respect to the supporting rods, while each lower chuck 10 is mounted so that its bearing 11 may be reciprocated longitudinally of the supporting rods. These chucks are adapted at certain stations to grip the tube blanks 9 so that the tubes may be stretched or drawn when heated to form a reduced neck portion. Normally the chucks are closed by means of the springs 12, 12', but are opened at certain stations by mechanism to be described hereinafter.

The main drive shaft for operating the machine is indicated at 13 on which are mounted pulley 14 and bevel gear 17. Pulley 14 drives a worm gear 15 by means of the belt or chain 18, worm gear 15 in turn driving worm wheel 16 secured to spider 5. Bevel gear 17 meshes with a second bevel gear 17' secured to shaft 20 journaled in bearing 19, there being secured to shaft 20 a gear 21 meshing with a freely rotatable ring gear 22 adapted to drive shaft 25 through gear 26 secured to the shaft 25.

Figures 8, 13, 14, 16, 17, 18, 19, 20, 21, 22:
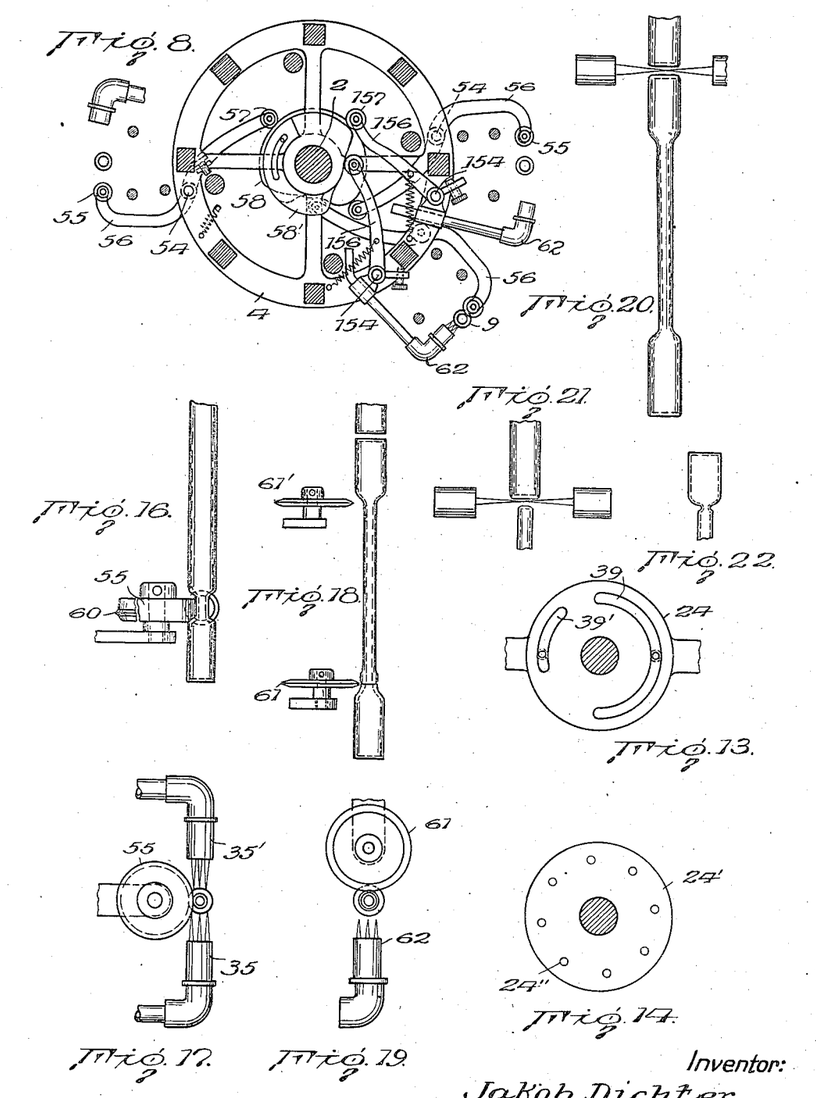
Fig. 8 is a top plan view partly in section of means for controlling the transverse movement of certain of the burners and constricting tools.
Fig. 13 is a partial top plan view of a valve for controlling the supply of gas to the burners.
Fig. 14 is a top plan view of another portion of the gas supply valve.
Fig. 16 is a fragmentary front view of a tool designed to constrict the tube when heated.
Fig. 17 is a partial top plan view of the tool shown in Fig. 16, showing the relation of the burners thereto.
Fig. 18 is a partial front view of another type of shaping tool.
Fig. 19 is a top plan view of the tool shown in Fig. 18, indicating its relation to a burner.
Fig. 20 is a diagrammatic illustration of the manner in which ampoules may be separated from a length of tubing by means of opposed burners.
Fig. 21 is a view similar to Fig. 20, but in which the tube is separated at the juncture of the reduced neck with the main body of the tubing.
Fig. 22 is a fragmentary view of an ampoule having a constriction between the neck and the large portion of the ampoule.
Figure 9:
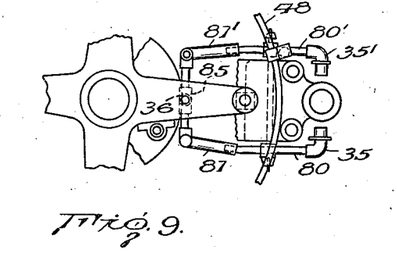
Fig. 9 is a fragmentary top plan view of the mounting for a pair of burners for locally heating a portion of a length of tubing.
Figure 15:
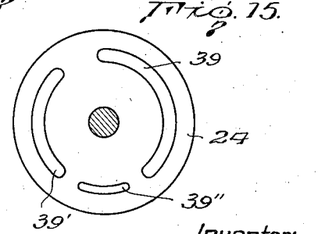
Fig. 15 is a top plan view of another form of gas supply valve.

Mounted rigidly on frame 1 and within the ring gear 22 is a disc 24 acting as a bearing for the ring gear. This disc is provided with arcuate grooves 39, 39', and 39'', as indicated in Figs. 13 and 15, the purpose of which will be explained hereinafter. Mounted for rotation on disc 24 is a second disc 24' which is movable with spider 5 and has a plurality of openings 24'', one for each station, connected with flexible couplings 36 through which gas is supplied to burners 35, 35'. Chucks 8 and 10 are driven, respectively, through gears 27, 29, 30 and 28, 29', 32, there being similar sets of gears for each pair of chucks. It is to be noted that gear 28 is splined on shaft 25 so that it is slidably axially with respect to the shaft but turns therewith. In this manner the chucks are driven in the same direction and at the same speed. Gear 28 is supported on collar 33 which, through yoke 34 on bearing 11, is adapted to follow vertical movement of the bearing so that the gears 28, 29' and 32 move together.

The means for controlling vertical reciprocations of the lower chucks 10 include a cam track 40 having adjustable portions 41, 42, 43 and 44 thereon. Each of the bearings 11 is secured to a rod 45 guided in bearing 46 and having at its lower end a cam follower 45' adapted to ride on the cam track. It will thus be apparent that as the follower rises and falls with the high and low portions of the cam track, the lower chuck 10 will also rise or fall.

Figure 3:
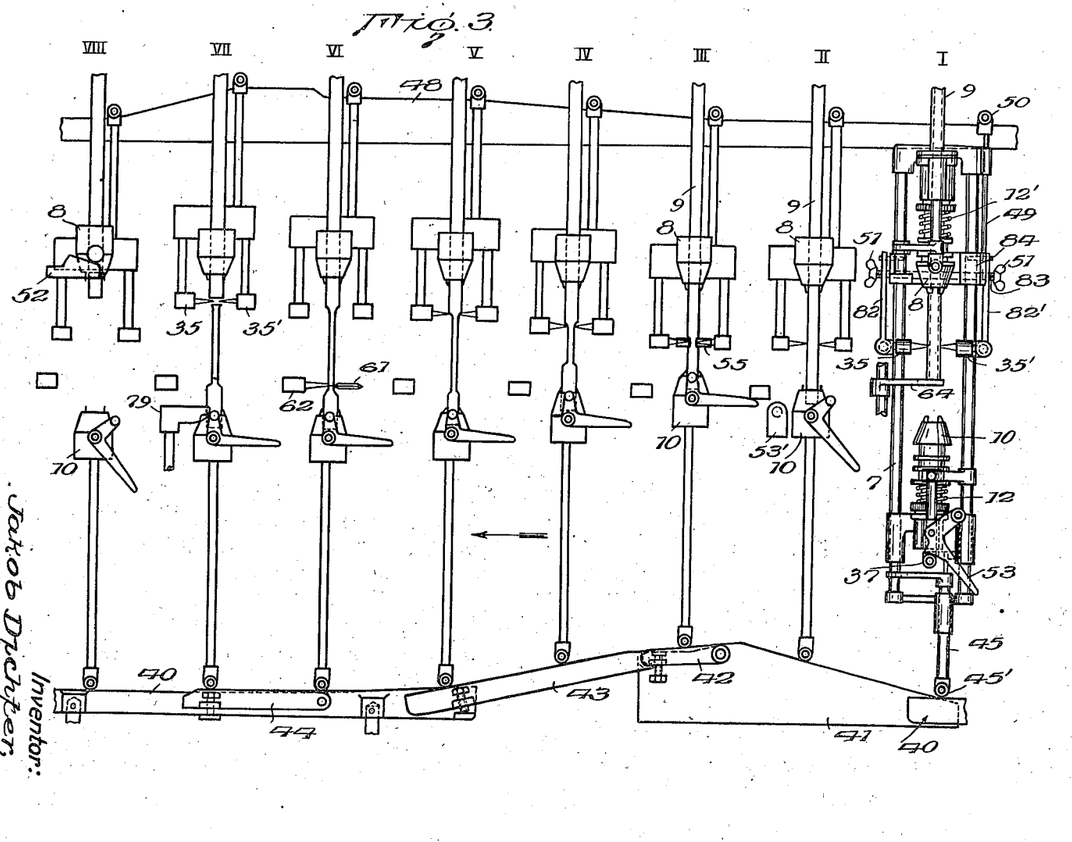
Fig. 3 is a diagrammatic developed elevation of the drawing mechanism and the means for controlling longitudinal movement of the burners.
Figure 4:
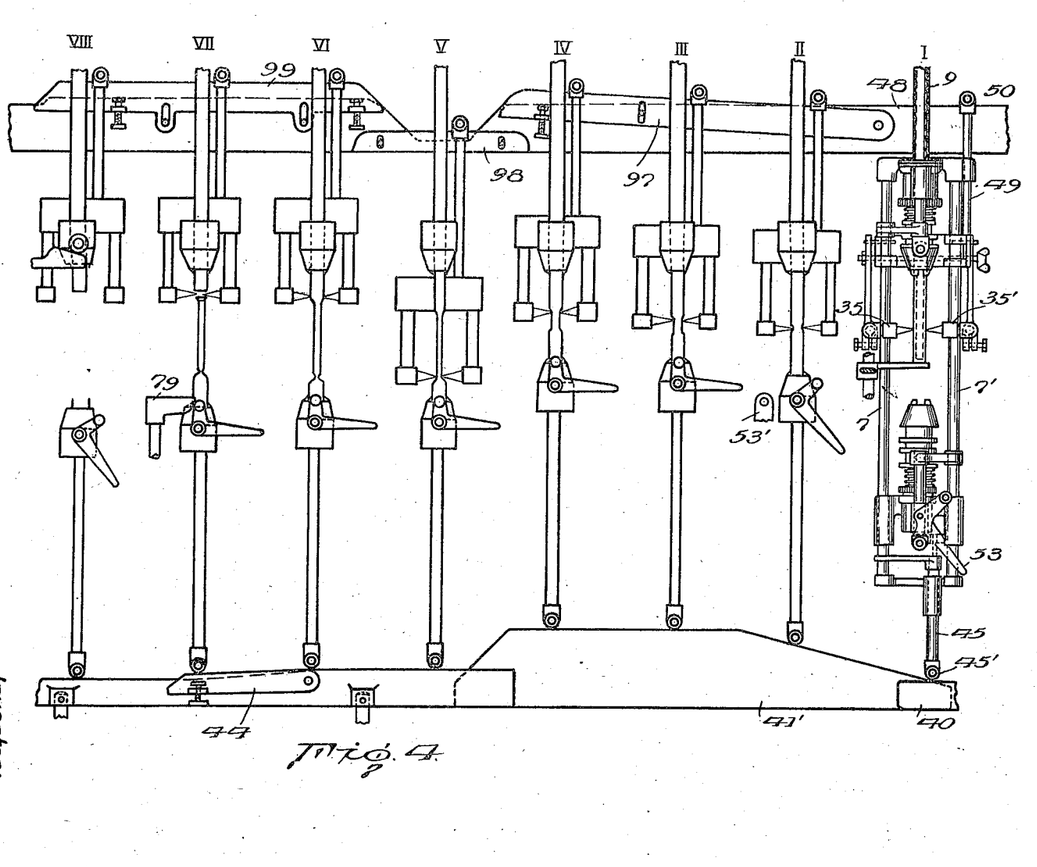
Fig. 4 is a diagrammatic developed elevation of a modified form of the machine.

In Figs. 3 and 4, there are shown eight stations, indicated I to VIII. It will be understood that these stations are spaced circumferentially around the machine so that, as the spiders 3 and 5 rotate, the upper chuck will first grip the tube, after which the lower chuck will engage the lower end of the tube and, after a portion of the tube is heated by the burner, the chuck 10 will be lowered to draw this heated portion and produce a reduced neck.

Secured to shaft 2 is a non-rotatable spider 47 to which is adjustably secured an upper cam track 48. This cam track may be a single element which, in its developed form, is shown in Fig. 3, or it may have auxiliary portions 97, 98, and 99, as indicated in Fig. 4. These auxiliary portions are adjustable with respect to the main track so as to vary the height of the cam at different stations and thus control the vertical movements of the burners.

Burners 35 and 35' are secured to a bracket 84 which in turn is fastened to rod 49 having at its upper end a cam follower 50 adapted to ride on track 48. As the spiders rotate, carrying with them the chucks and burners, the rod 49 lowers and elevates the burners in accordance with the risers or dwells in the cam track. It is thus apparent that the burners will not remain in a single horizontal position as the glass is drawn, but will be elevated to progressively heat the tube as it is drawn. In other words, as chuck 10 is lowered, the burners 35, 35' are elevated so that, instead of obtaining a tapered neck, the neck will be drawn from successive portions of the tube and will be substantially cylindrical.

Figures 2, 11, 12:
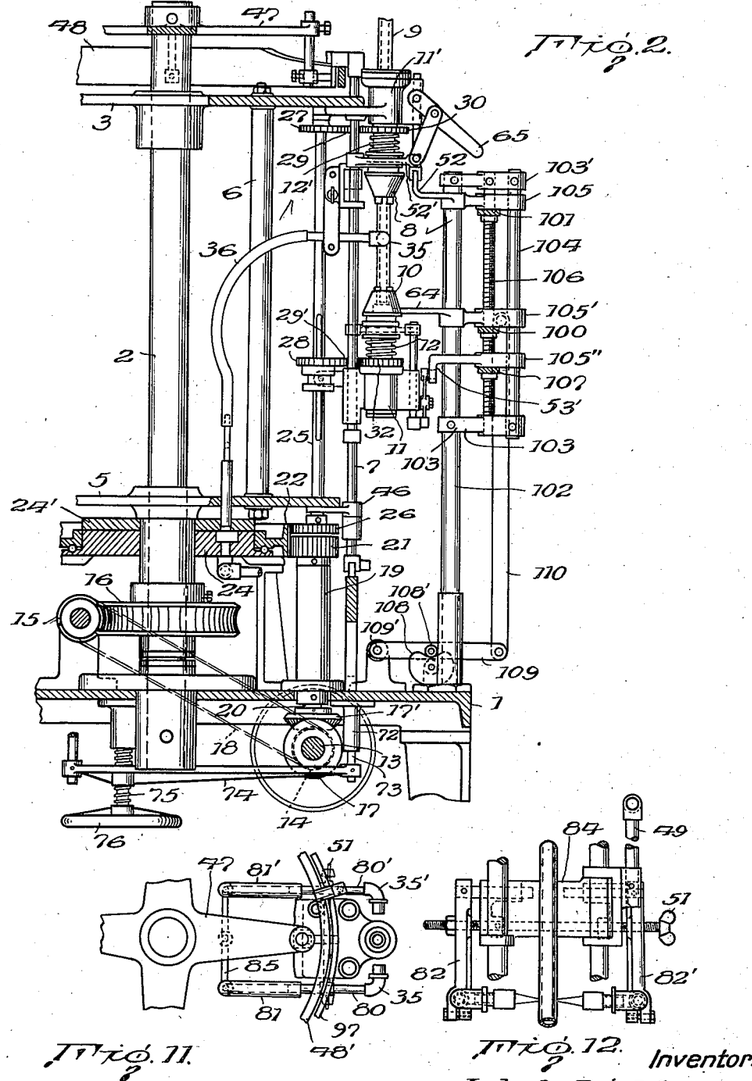
Fig. 2 is a partial elevation of a modified form of the machine shown in Fig. 1, parts thereof being shown in section.
Fig. 11 is a fragmentary top plan view of a modified form of mounting for a pair of burners, similar to that shown in Fig. 9.
Fig. 12 is a fragmentary front elevation of a bracket on which the burners are mounted.

Since the machine is adapted to operate with different diameters of tubes, it is desirable that the burners be adjustable with respect to each other. For this purpose, arms 82, 82' on bracket 84 may be adjusted with respect to each other by means of nuts 51 on the threaded spindle 83 in bracket 84 as shown in Figs. 11 and 12. It is therefore, apparent that the distance between the burners can be varied at will to compensate for varying diameters of the tube from which the ampoules are made.

In Figs. 1 to 4, it will be seen that an abutment 52, adjustably fixed on post 102, is adapted to engage yoke 52' cooperating with chuck 8 to elevate the chuck against spring 12' and thus open the chuck. This opening of the upper chuck occurs at the first station during the operation of the machine and permits the tube blank to fall a predetermined distance before the chuck is again closed. The lower chuck is provided with a lever 53 having an irregular shaped face cooperating with a stud 37 thereon to move the chuck head and thereby open and close the chuck against spring 12. It will be seen that at the first station, chuck 10 is in its lowest position and is open. At the second station it has been elevated to receive the end of the glass tube, held by chuck 8 which is closed as it moves from station I to station II, and immediately thereafter lever 53 engages abutment 53' at which time lever 53 is rocked to permit spring 12 to close the chuck and grip the end of the blank. Lever 53 remains in this position until after it has passed station VII, when it engages abutment 79 which again rocks the lever to open the chuck.

Figures 1, 7, 27:
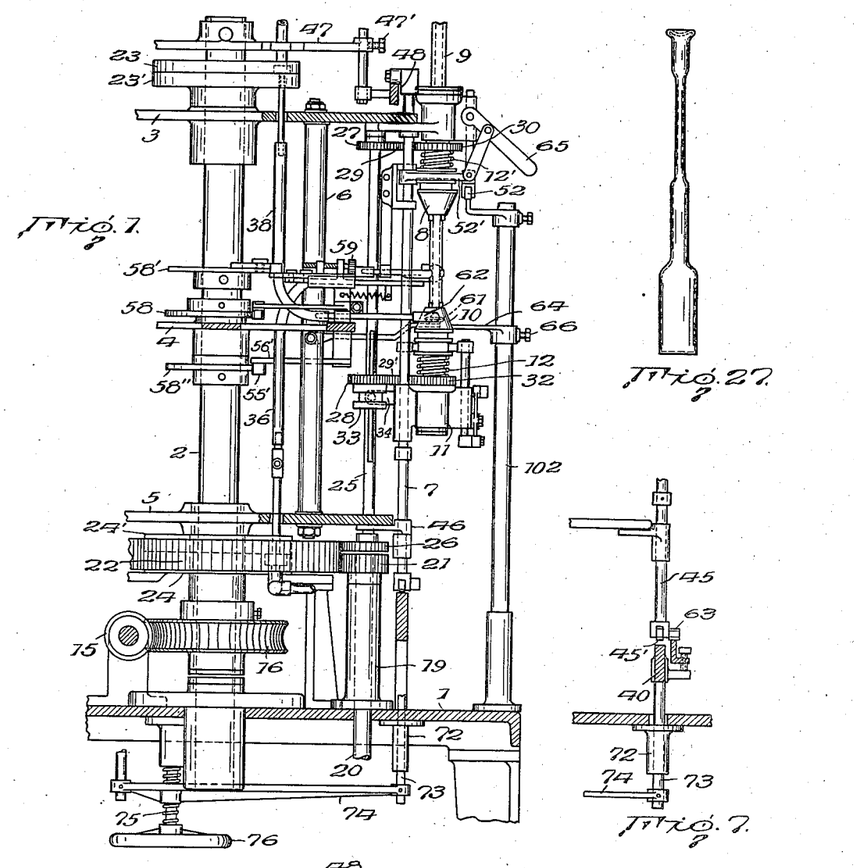
Fig. 1 is a partial elevation of the machine, parts thereof being shown in section.
Fig. 7 is a fragmentary section of a cam track for controlling vertical movement of the lower gripping chuck.
Fig. 27 is a front view of an ampoule having a plurality of reduced neck portions adapted to be made on the present machine.

As shown in Fig. 7, rods 45, as well as rods 49, are provided with auxiliary track followers 63 adapted to ride on the adjustable portions of cam tracks 40 and 48. The tracks 40 and 48 may be moved in their entirety axially with respect to the spiders 3 and 5. It will be seen that track 48 is suspended from arms 47 and held thereto by means of set screws 47'. This permits adjustment of the upper track. The lower track 40 is supported by rods 73 slidable in bearings 72 and secured to arms 74 mounted for vertical movement on threaded shaft 75 secured to the base of the machine. By turning the hand wheel 76, the arms 74, rods 73, and track 40 may be elevated or lowered, as desired.

Referring to Fig. 8, it will be seen that there is pivoted at 54 to spider 4 a plurality of arms 56, each carrying a tool 55 at one end thereof and a cam follower 57 at the other end thereof. There are also mounted on the spider a plurality of burners 62 pivotally mounted at 154 along with arms 156 having cam followers 157 thereon. The cam followers cooperate, respectively, with cams 58, 58' secured to shaft 2. If desired, cams 58, 58' may be made in two parts and be adjustable to vary the time during which the burners and tools are moved toward or away from the tube to be heated and shaped.

Figure 10:
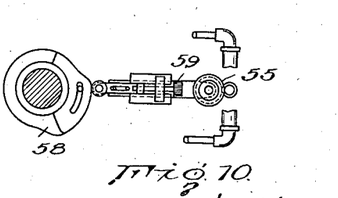
Fig. 10 is a fragmentary top plan view of a modified form of mechanism for actuating the constricting tool.

A modified form of mechanism for reciprocating the tool is shown in Fig. 10, in which the tool, instead of being pivotally mounted, is slidably mounted on the spider, the degree of engagement of the tool with the heated tube being controlled by an adjusting screw 59, or, if desired, the cam 58 may be made in two parts and adjustable to vary the time during which the tool is moved into engagement with the tube.

The tool 55 may have a smooth face, or it may have its corners beveled and, if desirable, have a circumferential rib 60 thereon, as indicated in Fig. 16. The face of this tool is relatively narrow and it is intended that it be employed to form a constriction in the tube after it has been heated but prior to the drawing operation which forms the elongated reduced neck on the ampoule. The tools 61, 61' are employed to form a constriction, such as shown in Fig. 22, between the neck and body portion of the ampoule. Burners 62 heat the tube prior to constriction by tools 61, 61'. In some ampoules this constriction is permitted to remain in the neck, although the tool may be used for preliminary constriction and thus expedite fire separation and closing of the end of the tube by burners, as shown in Fig. 21. The means for operating these last-mentioned tools consists of a cam 58'', shown in Fig. 1, cooperating with cam follower 57' and lever 56'.

As shown in Figs. 1 to 4, a bracket 64 forming a shelf or gauge plate is adjustably fixed on post 102 by means of set screw 66. At station I, both chucks are open and a finished ampoule has just been removed from the lower chuck. As the upper chuck is opened by the cam or abutment 52, the tubing 9 is permitted to drop until it rests on the gauge plate 64. The position of the gauge plate 64 determines the length of tubing which will be gripped by the chucks during subsequent operations. An auxiliary chuck opening mechanism is shown at 65, and comprises a lever arrangement for lifting the jaws against springs 12'. This permits opening of the upper chuck at any of the stations.

After the tube has been gripped by the upper chuck, it is moved from station I to station II, at which time the burners begin to heat the tube. Immediately after passing station II, the lower chuck is closed by the abutment 53'. At station III the constricting tools 55 are brought into engagement with the relatively narrow heated zone of the tube to form a preliminary constriction therein. At subsequent stations IV and V, it will be seen that the lower chuck, following track 40 and its adjustable parts 42 and 43, draws the heated portion of the tubing and thereby reduces its diameter. At the same time the burners through the rods 49 and upper track 48 are slowly elevated to heat successive portions of the tube above that portion which is being drawn. In this manner, the cold portions of the tubing above the constricted part are progressively heated and, instead of a tapered neck being formed, the reduced drawn portion is substantially cylindrical.

At station VI, it will be seen that the auxiliary constricting tool 61 and burner 62 are brought into play to form a constriction in the neck adjacent the larger body portion of the ampoule. At station VII, the upper end of the ampoule neck is separated from the tubing by means of burners 35, 35', and the lower chuck is opened by abutment 79. Suitable means are then provided to release the shaped ampoule from the lower chuck. It will be seen that at station VIII, the upper chuck is also opened and the tube has begun to drop to the position shown at the initial station. It will be understood that the burners 62 are moved transversely with respect to the tubing by means of the cam mechanisms previously referred to and gas supplied thereto by means of the valves 23, 23'. Suitable pilot flames (not shown) are spaced at intervals to permit the burners to be reignited at the several stations.

It will be seen that the burners 35, 35' are connected to a flexible connection 36, pipes 80, 80', elbows 81, 81', and a T-connection 85. Although the connections between the valves and burners are shown at only one station, it is to be understood that there is a pair of burners and connections therefor at each of the stations indicated. There is also a burner 62 connected to the upper valve 23, 23' through the flexible connection 38.

The upper and lower tracks may be so formed that the relative movement of the chucks with respect to each other are so controlled that the diameter of the reduced neck portion may be varied, as shown in Fig. 27. This may be done by a relatively rapid movement of the burners over one portion of the tube and then a slower movement of the burners over another portion of the tube.

In the modified form of the machine shown in Fig. 2, it will be seen that there are mounted on post 102 a pair of brackets 103, 103', supporting a guide bar 104 and a threaded rod 106. Slidably mounted on post 102 and bar 104 and adapted to be vertically adjustable thereon are brackets 105, 105' and 105''. These brackets serve to support abutments 52, 53' and gauge plate 64. The positions of these brackets are fixed by adjusting the nuts 100, 101, and 107.

Connected to bracket 105' is a link 110, the latter also being pivotally connected to a rock lever 109 journaled at 109' to the frame of the machine. Cam 108 cooperates with a follower 108' on lever 109 to elevate link 110 and with it bracket 105' at predetermined intervals. This is done so that gauge plate 64 may be raised to minimize the drop of the glass tube as when the chuck 8 is opened.

Figure 5:
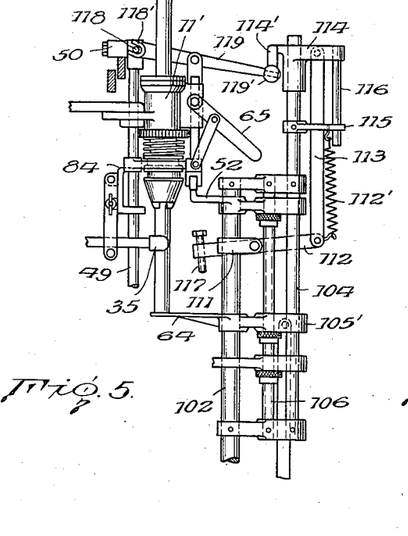
Fig. 5 is a fragmentary side view of the mechanism for elevating a gauge plate and burners.

At the same time it is desirable to elevate the burners when plate 64 is raised. Referring to Fig. 5, it will be seen that burner 35 is mounted on bracket 84 which in turn is secured to rod 49. The upper end of rod 49 is provided with pins 118, the latter being engaged by a yoke 118' at the end of lever 119 pivoted on bearing 11'. Lever 119 is provided at its other end with a roller or follower 119' engageable with a cam 114' on collar 114. Adjustably fastened to post 102 is a bracket 111 to which is pivoted lever 112, the latter being connected by link 113 to the collar 114. It will be seen that collar 114 is slidable on rod 104 and is provided with a guide pin 116 slidably cooperating with guide 115. Lever 112 is normally held in the position shown in Fig. 5 by a spring 112' connected to one end thereof. At its other end the lever 112 is threaded to receive an adjustable stop bolt 117. It will, therefore, be seen that when plate 64 has been elevated sufficiently to engage bolt 117, cam 114' will engage the follower on lever 119, whereupon rod 49 and the burner carried thereby will be elevated.

Figure 6:
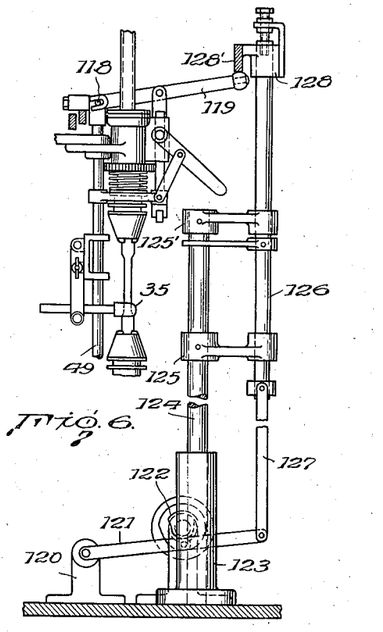
Fig. 6 is an elevation of supplemental means for rapidly reciprocating the burners at one of the stations in the machine.

In Fig. 6 is shown another form of burner elevating mechanism for moving the burners 35, 35' rapidly from one position to another at station V. It is obvious that it might de difficult to effect this rapid movement solely with a cam track. In this mechanism it will be seen that lever 121 is pivotally connected to journal 120 and is adapted to be oscillated by means of a grooved cam 122. Lever 121 is connected by means of link 127 to rod 126 slidably mounted in brackets 125 and 125' secured to post 124 fixed in bearing 123. At its upper end the rod 126 carries a collar 128 having a cam piece 128' thereon. When rod 126 is depressed, it acts to raise rod 49 and burner 35 carried thereby.

With this arrangement the burners 35, 35' may be employed not only to soften the tube prior to drawing and constriction thereof, but for separation thereof from the tube. It is for this reason that grooves 39, 39', 39'' are provided in valve 24, certain of the grooves being connected to a supply of gas and air of predetermined proportions designed to produce a softening flame, while the other grooves supply a mixture of different proportions intended to produce an intense or cutting flame.

Figure 24:
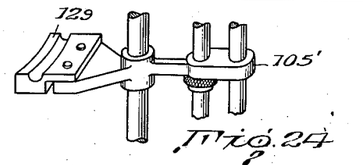
Fig. 24 is a fragmentary perspective view of a gauge plate having a bottom shaping groove therein.
Figure 25:
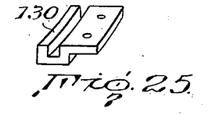
Figs. 25 and 26 are fragmentary views of other forms of bottom shaping tools.
Figure 26:
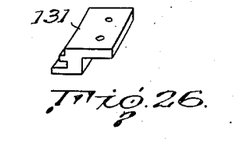

In machines wherein the spiders carrying the chuck rotate continuously, it may be desirable to substitute for the gauge plate 64, bottom shaping members such as shown in Figs. 24, 25, and 26. It is frequently customary when separating the shaped ampoule from the tubing supported by the upper chuck to employ flame separation. While the end of the tubing is still hot and plastic, it may be dropped on the bottom shaping tools supported by bracket 105' as shown in Fig. 24, and, since it is being rotated, it will receive a shape corresponding to the cross section of the groove formed in the shaping members 129, 130, or 131; that is, it may be a semi-spherical bottom corresponding to the groove in member 129, or a flat bottom as shaped by the groove shown in Fig. 25, or a T-shaped bottom, if it engages a shaper such as shown at 131 in Fig. 26. If desirable, air under pressure may be admitted to the interior of the tube through the open upper end thereof to facilitate the shaping of the bottoms of the tube.

Figure 23:
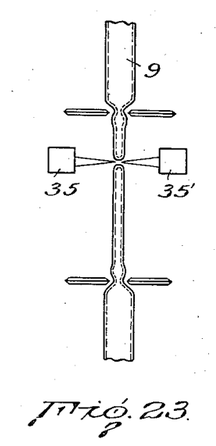
Fig. 23 illustrates the manner in which a pair of ampoules are separated from each other by burners operating on the neck portions thereof.

While several arrangements of burners have been illustrated and various forms of ampoules shown, it is to be understood that the mechanism described herein is sufficiently flexible to employ several forms of cam tracks adapted to separate the shaped article from the tubing in any one of several ways. For instance, in Fig. 20 a double ampoule, that is one having two bulb portions and a single neck, may be shaped after which the shaped article may be separated from the tubing by a flame directed at the point indicated in this figure, or, if desired, the reduced neck section may be separated at its juncture with the larger portion of the tube, as shown in Fig. 21. It is also possible to separate the formed ampoule from the tubing by separation of portions of the reduced neck intermediate its length, as shown in Fig. 23. In this figure, it will be noted that the neck is constricted by tools at the juncture of the main body of the ampoule with the neck portion.

While preferred embodiments of the machine have been described and illustrated, it is to be understood that the invention is susceptible of modification and it is, therefore, not intended that it be limited to the exact details shown and described herein.

Having described my invention, what I claim as new and desire to secure by Letters Patent is:

1. In a machine of the class described, a pair of gripping devices for engaging a length of tubing, means for heating a portion of the length of tubing between the gripping devices while the length of tubing is held by said gripping devices, means for effecting relative movement of said devices away from each other axially of the tubing to reduce the cross sectional area of the heated portion of the tubing, means for moving certain of said heating means transversely with respect to the tubing, and means for moving others of said heating means in predetermined timed relation to the said movement of the gripping devices in a direction parallel to the axis of the tubing while said gripping devices are moving relative to each other to progressively heat successive increments of the tubing.

2. In a machine of the class described, a pair of gripping devices for engaging a length of tubing, means for heating a portion of the length of tubing between the gripping devices while the length of tubing is held by said devices, means for constricting the heated portion of the tubing, means for thereafter effecting relative movement of said devices away from each other axially of the tubing to reduce the cross sectional area of the heated portion of the tubing, and means for moving said heating means in predetermined timed relation to the said movement of the gripping devices in a direction parallel to the axis of the tubing while said devices are moving relative to each other to progressively heat successive increments of the tubing.

3. In a machine of the class described, a pair of vertically aligned gripping devices for engaging a length of tubing, means for heating a portion of the length of tubing between the gripping devices while the tubing is held by said devices, means for opening and closing said gripping devices, the upper of said gripping devices being constructed to permit tubing to pass therethrough by gravity when said upper gripping device is open, a gauge plate disposed in axial alignment with said gripping devices at one position of the gripping devices and adapted to limit the length of tubing passing through the upper gripping device, and means for reciprocating said gauge plate in a direction axially with respect to the tubing.

4. In a machine of the class described, a pair of vertically aligned gripping devices for engaging a length of tubing, means for heating a portion of the length of tubing between the gripping devices while the tubing is held by said devices, means for opening and closing said gripping devices, the upper of said gripping devices being constructed to permit tubing to pass therethrough by gravity when said upper gripping device is open, a gauge plate disposed in axial alignment with said gripping devices at one position of the gripping devices and adapted to limit the length of tubing passing through the upper gripping device, and means for simultaneously reciprocating said gauge plate and heating means vertically with respect to said gripping devices.

5. In a machine of the class described, a pair of vertically aligned gripping devices for engaging a length of tubing, means for heating a portion of the length of tubing between the gripping devices while the tubing is held by said devices, means for opening and closing said gripping devices, the upper of said gripping devices being constructed to permit tubing to pass therethrough by gravity when said upper gripping device is open, a guage plate disposed in axial alignment with said gripping devices at one position of the gripping devices and adapted to limit the length of tubing passing through the upper gripping device, means for reciprocating said gauge plate in a direction axially with respect to the tubing, and means responsive to elevation of said gauge plate for elevating said heating means.

6. In a machine of the class described, a pair of vertically aligned gripping devices for engaging a length of tubing, means for heating a portion of the length of tubing between the gripping devices while the tubing is held by said devices, means for opening and closing said gripping devices, the upper of said gripping devices being constructed to permit tubing to pass therethrough by gravity when said upper gripping device is open, a gauge plate disposed in axial alignment with said gripping devices at one position of the gripping devices and adapted to limit the length of tubing passing through the upper gripping device, means for reciprocating said gauge plate in a direction axially with respect to the tubing, and shaping means on said gauge plate for forming a closed bottom at the lower end of said tubing.

JAKOB DICHTER.